(12) United States Patent
Ikemoto

(10) Patent No.: US 11,085,548 B2
(45) Date of Patent: Aug. 10, 2021

(54) VALVE DEVICE

(71) Applicant: DENSO CORPORATION, Kariya (JP)

(72) Inventor: Tadashi Ikemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 56 days.

(21) Appl. No.: 16/710,353

(22) Filed: Dec. 11, 2019

(65) Prior Publication Data

US 2020/0109788 A1 Apr. 9, 2020

Related U.S. Application Data

(63) Continuation of application No. PCT/JP2018/022205, filed on Jun. 11, 2018.

(30) Foreign Application Priority Data

Jun. 14, 2017 (JP) .............................. JP2017-116601

(51) Int. Cl.
| | |
|---|---|
| *F16K 11/076* | (2006.01) |
| *F16K 11/10* | (2006.01) |
| *F16K 11/085* | (2006.01) |
| *F16K 27/00* | (2006.01) |

(52) U.S. Cl.
CPC ............ *F16K 11/076* (2013.01); *F16K 11/10* (2013.01); *F16K 11/0856* (2013.01); *F16K 27/00* (2013.01)

(58) Field of Classification Search
CPC . F16K 11/076; F16K 11/10; Y10T 137/86763
See application file for complete search history.

(56) References Cited

U.S. PATENT DOCUMENTS

| | | | | |
|---|---|---|---|---|
| 2010/0206412 | A1* | 8/2010 | Smith | ....................... F16K 3/10 |
| | | | | 137/625.45 |
| 2012/0285321 | A1* | 11/2012 | Koski | ................ B01D 53/0446 |
| | | | | 95/143 |
| 2016/0218602 | A1* | 7/2016 | Fukushima | ............ H02K 5/225 |
| 2016/0281585 | A1 | 9/2016 | Muizelaar et al. | |
| 2017/0122181 | A1 | 5/2017 | Murakami | |

FOREIGN PATENT DOCUMENTS

| | | |
|---|---|---|
| JP | 8-338544 | 12/1996 |
| JP | 2015-1256 | 1/2015 |
| JP | 2016-31139 | 3/2016 |
| WO | 2016/194502 | 12/2016 |
| WO | 2019/021920 | 1/2019 |

OTHER PUBLICATIONS

U.S. Appl. No. 16/749,037 to Kanzaki, titled"Valve Device and Cooling System", filed Jan. 22, 2020 (36 pages).

* cited by examiner

*Primary Examiner* — Kevin R Barss
(74) *Attorney, Agent, or Firm* — Nixon & Vanderhye P.C.

(57) ABSTRACT

A cooling-water control valve as a valve device includes a housing and a valve member. The housing has an inlet port and multiple outlet ports, each of which connects an inner space of the housing to an outside. The valve member is rotatably provided in the inner space of the housing and connects the inlet port to the multiple outlet ports or disconnects the inlet port from the outlet ports depending on a rotational position of the valve member. The inlet port is communicated to the inner space of the housing independently of the rotational position of the valve member. At least a part of one outlet port overlaps with one or more than one of the other outlet ports, when viewed them in an axial direction of the valve member.

6 Claims, 14 Drawing Sheets

VALVE DEVICE

CROSS REFERENCE TO RELATED APPLICATION

The present application is a continuation application of International Patent Application No. PCT/JP2018/022205 filed on Jun. 11, 2018, which designated the U.S.A. and claims the benefit of priority from Japanese Patent Application No. 2017-116601 filed on Jun. 14, 2017. The entire disclosures of all of the above applications are incorporated herein by reference.

TECHNICAL FIELD

The present disclosure relates to a valve device having a housing and a valve member.

BACKGROUND

A valve device is known in the art, according to which an inlet port and an outlet port of a housing are communicated to each other or communication between them is blocked off depending on a rotational position of a valve member. According to one of prior arts, a valve device is applied to a cooling system for an internal combustion engine of an automotive vehicle and the valve device controls a circulation passage for engine cooling water. The valve device includes multiple (for example, three) inlet ports and one outlet port.

According to the above valve device, the multiple inlet ports are provided at different positions of a housing. Each of pipe portions to be connected to the respective inlet ports extends in different directions. It is difficult to mount the valve device in a narrow space, when considering possible interference between those pipe portions and other components.

SUMMARY OF THE DISCLOSURE

It is an object of the present disclosure to provide a valve device, which can be mounted in a narrow space.

According to one of features of the present disclosure, the valve device includes a housing and a valve member. The housing has a first port and multiple second ports, each of which connects an inner space of the housing to an outside of the housing. The valve member is rotatably provided in the inner space of the housing. The valve member connects the first port to the multiple second ports, or disconnects the first port from the second ports, depending on a rotational position thereof. The first port is communicated to the inner space independently of the rotational position of the valve member. At least a part of one second port overlaps with one or more than one of the other second ports, when viewed them in an axial direction of the valve member.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
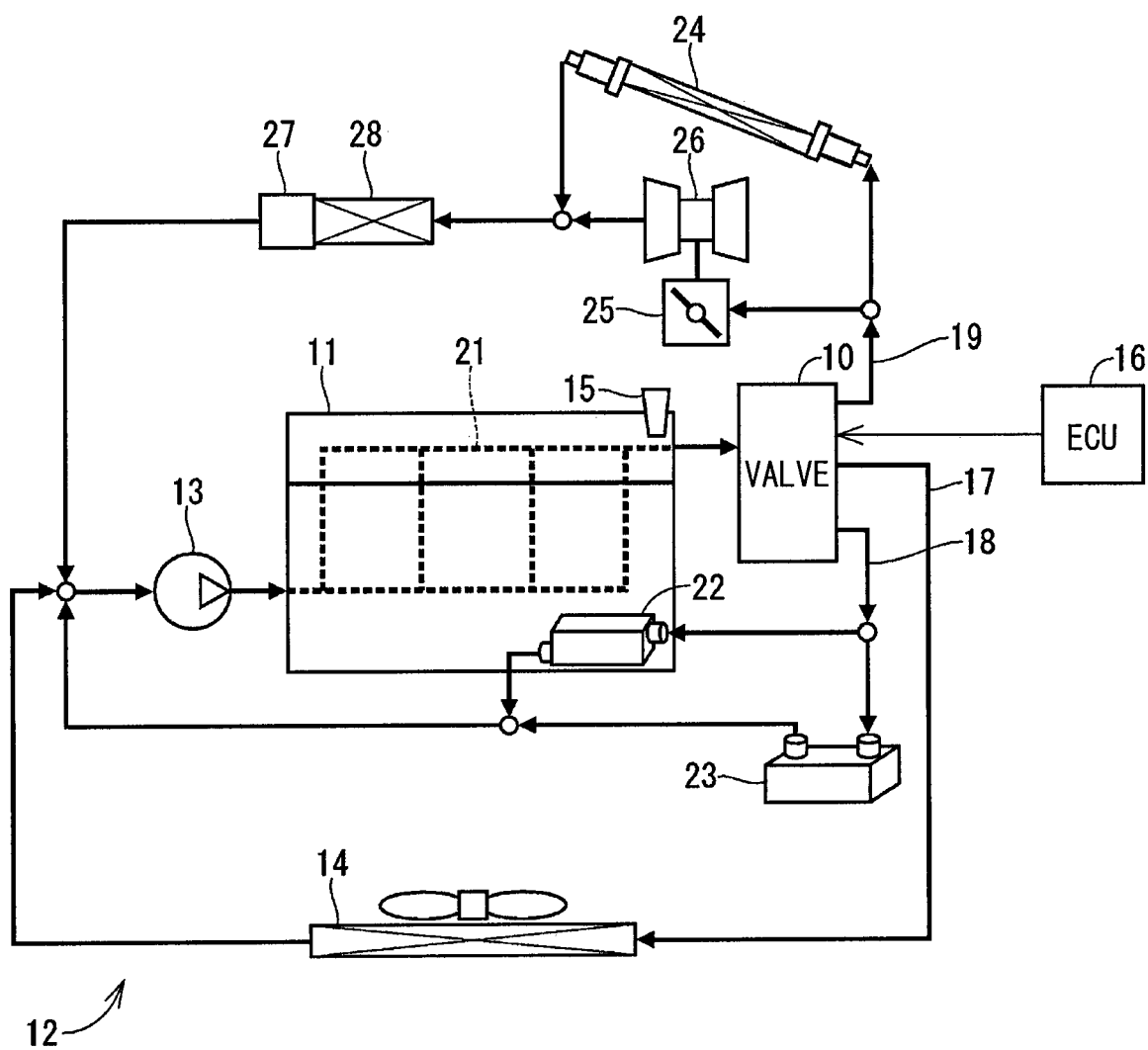
FIG. 1 is a schematic view for explaining a cooling system to which a cooling-water control valve according to a first embodiment is applied.

Multiple embodiments will be explained hereinafter with reference to the drawings. The same reference numerals are given to the same or similar structures and/or portions in each of the drawings in order to avoid repeated explanation.

First Embodiment

A cooling-water control valve 10 is shown in FIG. 1 as a valve device according to a first embodiment. The cooling-water control valve 10 is applied to a cooling device 12 (also referred to as a cooling system 12) for an internal combustion engine 11 (hereinafter, the engine 11) of an automotive vehicle.

(Cooling System)

At first, the cooling system 12 will be explained. As shown in FIG. 1, the cooling system 12 includes a water pump 13, the cooling-water control valve 10, a radiator 14, a water temperature sensor 15, an electronic control unit (ECU) 16 and so on. The water pump 13 is provided at a position, at which multiple circulation passages 17, 18 and 19 get together. The water pump 13 pumps out cooling water to a water jacket 21 of the engine 11. The cooling-water control valve 10 is provided at a bifurcation point of the circulation passages 17, 18 and 19, for example, at an outlet portion of the water jacket 21. The cooling-water control valve 10 controls a flow amount of the cooling water flowing through each of the circulation passages 17, 18 and 19.

The radiator 14 is a heat exchanger provided in the circulation passage 17 for cooling down temperature of the cooling water through heat exchange between the cooling water and air. An engine oil cooler 22 and a transmission oil cooler 23 are provided in the circulation passage 18. A heater core 24, a throttle valve 25, a supercharger 26, an EGR (Exhaust Gas Recirculation) valve 27 and an EGR cooler 28 are provided in the circulation passage 19.

The water temperature sensor 15 is provided at an upstream side of the cooling-water control valve 10. The electronic control unit (ECU) 16 operates the cooling-water control valve 10 depending on the temperature detected by the water temperature sensor 15 to control the flow amount of the cooling water in each of the circulation passages 17, 18 and 19.

(Cooling-Water Control Valve)

Figure 2:
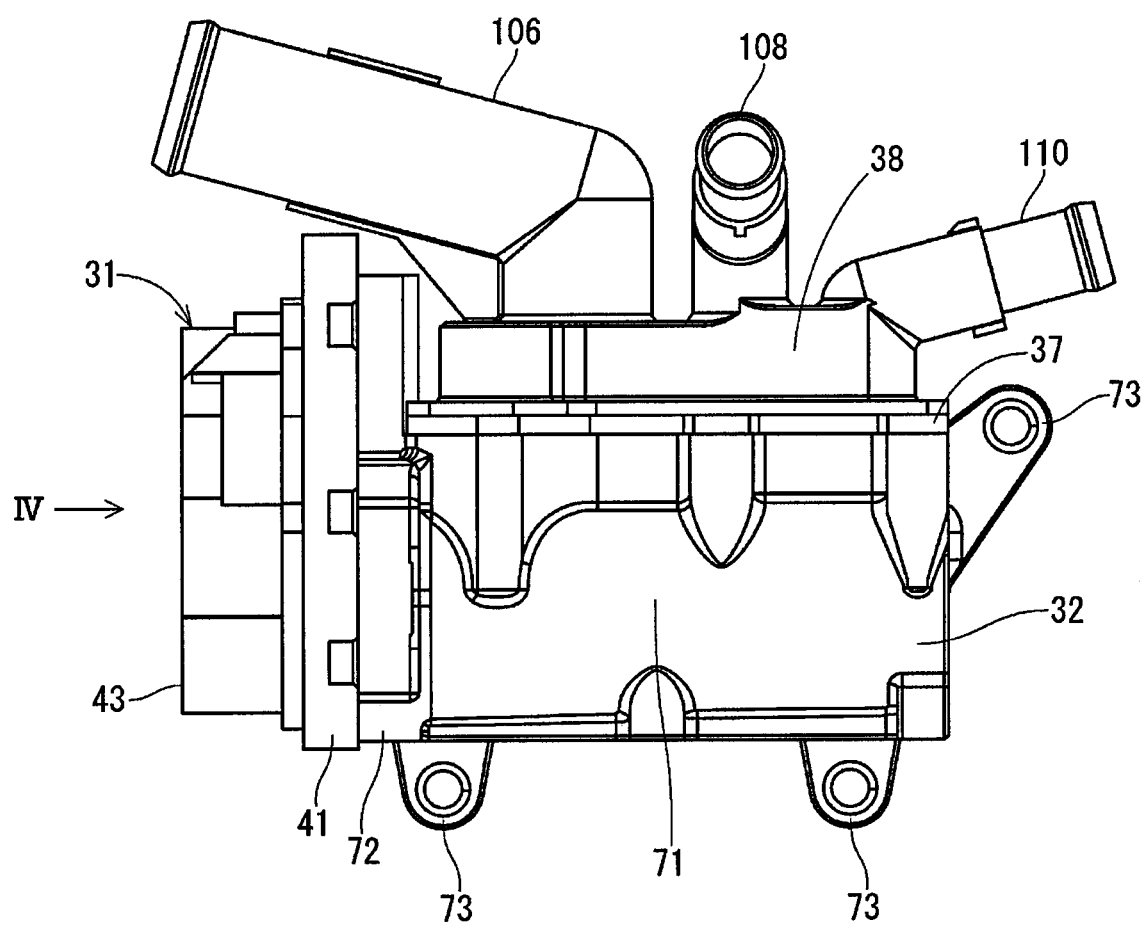
FIG. 2 is a schematic outline view showing the cooling-water control valve of FIG. 1.
Figure 3:
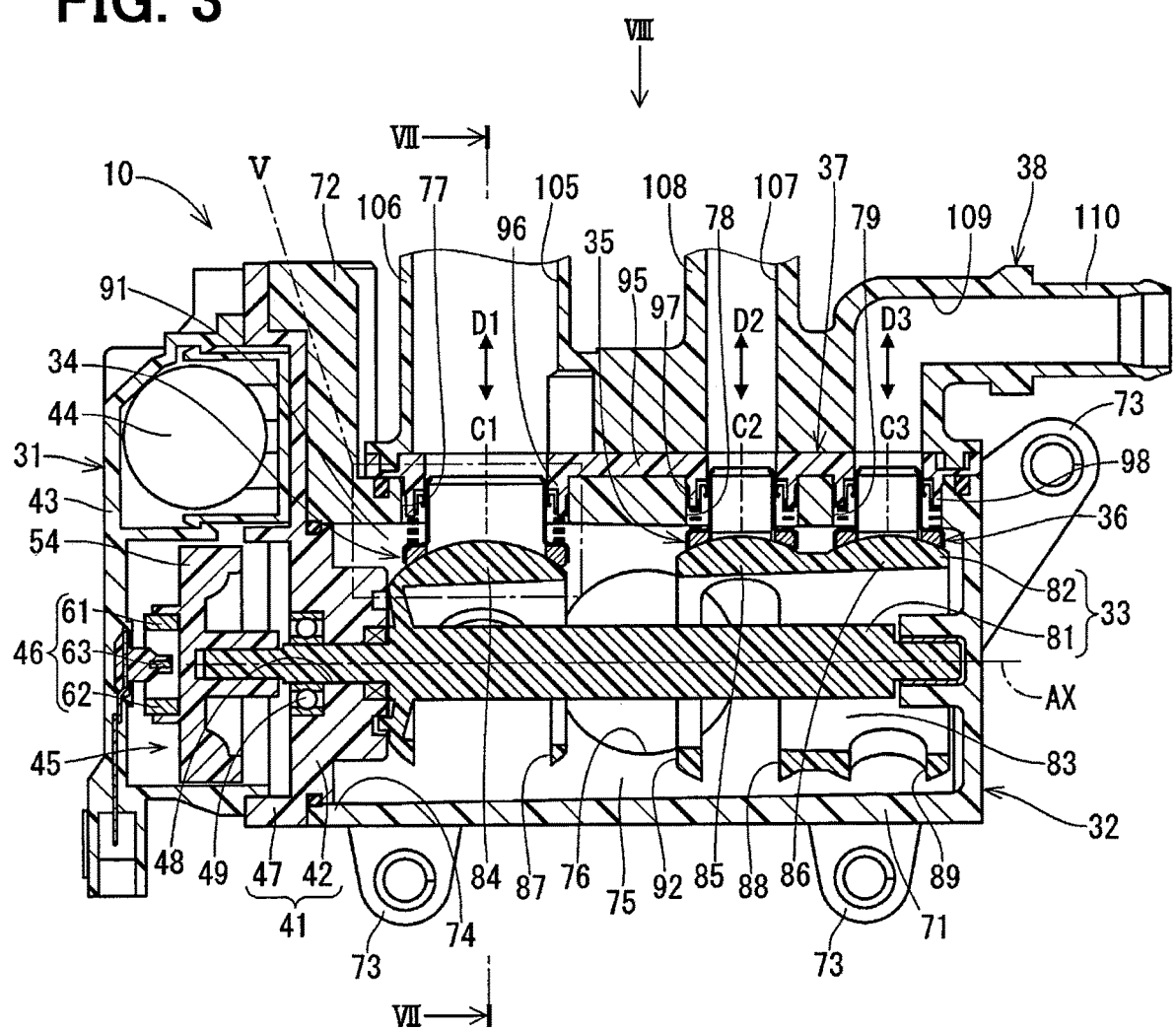
FIG. 3 is a schematic cross-sectional view taken along a plane passing through an axis line of a valve member for the cooling-water control valve of FIG. 2 and showing a condition that an opening degree at each opened portion of the valve member is 0%.

Now, the cooling-water control valve 10 will be explained. As shown in FIGS. 2 and 3, the cooling-water control valve 10 includes a driving portion 31, a housing 32, a valve member 33, sealing units 34, 35 and 36, a holding plate 37 and a pipe member 38.

Figure 4:
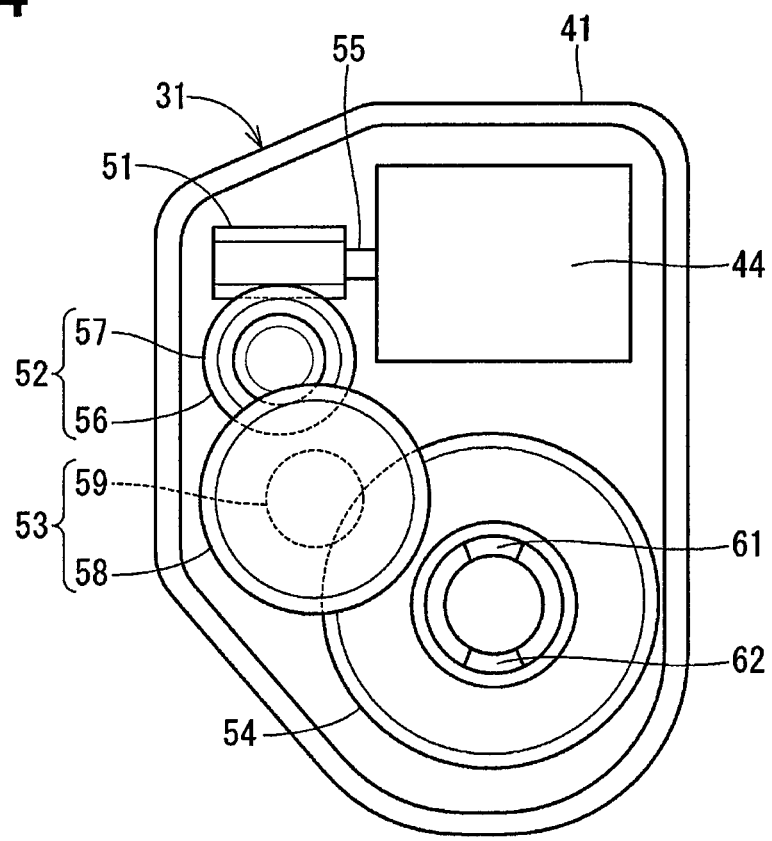
FIG. 4 is a schematic view showing the cooling-water control valve of FIG. 2 when viewed it in a direction of an arrow IV in FIG. 2, wherein a cover member is removed.

As shown in FIGS. 3 and 4, the driving portion 31 includes a casing member 41, a cover member 43 for forming an accommodation space together with the casing member 41, an electric motor 44 and a speed reduction device 45 both of which are accommodated in the accommodation space, and a rotational angle sensor 46.

The casing member 41 includes a base portion 47 of a plate shape and a fitting portion 42 fitted into an opening portion 74 of the housing 32. A shaft insertion hole 48 and a bearing 49 are provided at a center portion of the fitting portion 42. One end of a shaft portion 81 of the valve member 33 is inserted into the shaft insertion hole 48. The bearing 49 supports the one end of the shaft portion 81.

The speed reduction device 45 includes a cylindrical gear 51, a first gear 52, a second gear 53 and a third gear 54. The cylindrical gear 51 is connected to an output shaft 55 of the electric motor 44. The first gear 52 has a first large-diameter gear portion 56 to be engaged with the cylindrical gear 51 and a first small-diameter gear portion 57, a diameter of which is smaller than that of the first large-diameter gear portion 56. The second gear 53 has a second large-diameter gear portion 58 to be engaged with the first small-diameter gear portion 57 and a second small-diameter gear portion 59, a diameter of which is smaller than that of the second large-diameter gear portion 58. The third gear 54 is engaged with the second small-diameter gear portion 59 and connected to the one end of the shaft portion 81 of the valve member 33. The speed reduction device 45 reduces rotational speed of a driving power of the electric motor 44 and outputs the same to the valve member 33.

The rotational angle sensor 46 includes magnets 61 and 62 provided in the third gear 54 and a magnetic detecting portion 63 provided at a position between the magnets 61 and 62 and on an axis line AX of the valve member 33. The magnetic detecting portion 63 is composed of, for example, a hall IC (Integrated Circuit) or the like. The magnetic detecting portion 63 detects a rotational angle of the valve member 33 by detecting a magnetic field which is changed depending on a rotation of the valve member 33.

As shown in FIGS. 2 and 3, the housing 32 includes a cylindrical housing main body 71 having an inner space 75, mounting flanges 73 for mounting the cooling-water control valve 10 to the engine 11, and a fixing flange 72 for fixing the driving portion 31 to the cooling-water control valve 10. The opening portion 74 is formed at one end of the housing main body 71.

An inlet port 76 and multiple outlet ports 77, 78 and 79 are formed in the housing main body 71, each of which communicates the inner space 75 to an outside (that is, an outside space of the housing 32). In the first embodiment, each of the inlet port 76 and the outlet ports 77, 78 and 79 is formed in side wall portions of the housing main body 71.

The valve member 33 is movably accommodated in the inner space 75 so that it is rotatable around the axis line AX. The valve member 33 communicates the inlet port 76 to the outlet ports 77, 78 and 79, or blocks off the communication between them, depending on its rotational position. The valve member 33 has the shaft portion 81 and a cylindrical portion 82 formed at an outer side of the shaft portion 81.

The shaft portion 81 is rotatably supported by the bearing 49 and the housing main body 71. The cylindrical portion 82 is connected at its one axial end to the shaft portion 81. The shaft portion 81 and the cylindrical portion 82 are formed as one integral member. A valve inside passage 83 is formed between the shaft portion 81 and the cylindrical portion 82.

The cylindrical portion 82 has annular convex portions 84, 85 and 86, which are arranged in this order in an axial direction of the valve member 33. The annular convex portion 84 is formed at an axial position, which corresponds to a position of the outlet port 77. The annular convex portion 85 is formed at another axial position, which corresponds to a position of the outlet port 78, and the annular convex portion 85 is connected to the annular convex portion 84 by a connecting portion (not shown). The annular convex portion 86 is formed at a further different axial position, which corresponds to a position of the outlet port 79, and the annular convex portion 86 is connected to the annular convex portion 85. An outer surface of each annular convex portion 84, 85 and 86 is formed with a spherical surface.

The cylindrical portion 82 has opened portions 87, 88 and 89 for respectively communicating each of the outlet ports 77, 78 and 79 to the valve inside passage 83 depending on the rotational position of the valve member 33. The cylindrical portion 82 further has an opened portion 92 for communicating the valve inside passage 83 to the inlet port 76 via a part of the inner space 75 (that is, the part at an outside of the valve member 33, which is hereinafter referred to as a valve outside passage 91). The opened portion 87 is formed in the annular convex portion 84 for operatively communicating the valve inside passage 83 to the outlet port 77. The opened portion 88 is formed in the annular convex portion 85 for operatively communicating the valve inside passage 83 to the outlet port 78. The opened portion 89 is formed in the annular convex portion 86 for operatively communicating the valve inside passage 83 to the outlet port 79. The opened portion 92 is formed between the annular convex portion 84 and the annular convex portion 85.

The holding plate 37 is a holding member for holding the sealing units 34, 35 and 36 and has a plate portion 95 and holding portions 96, 97 and 98. The plate portion 95 is formed in a plate shape and fixed to the housing main body 71. Each of the holding portions 96, 97 and 98 is an annular projection, which is projected from the plate portion 95 into each of the outlet ports 77, 78 and 79.

Figure 5:
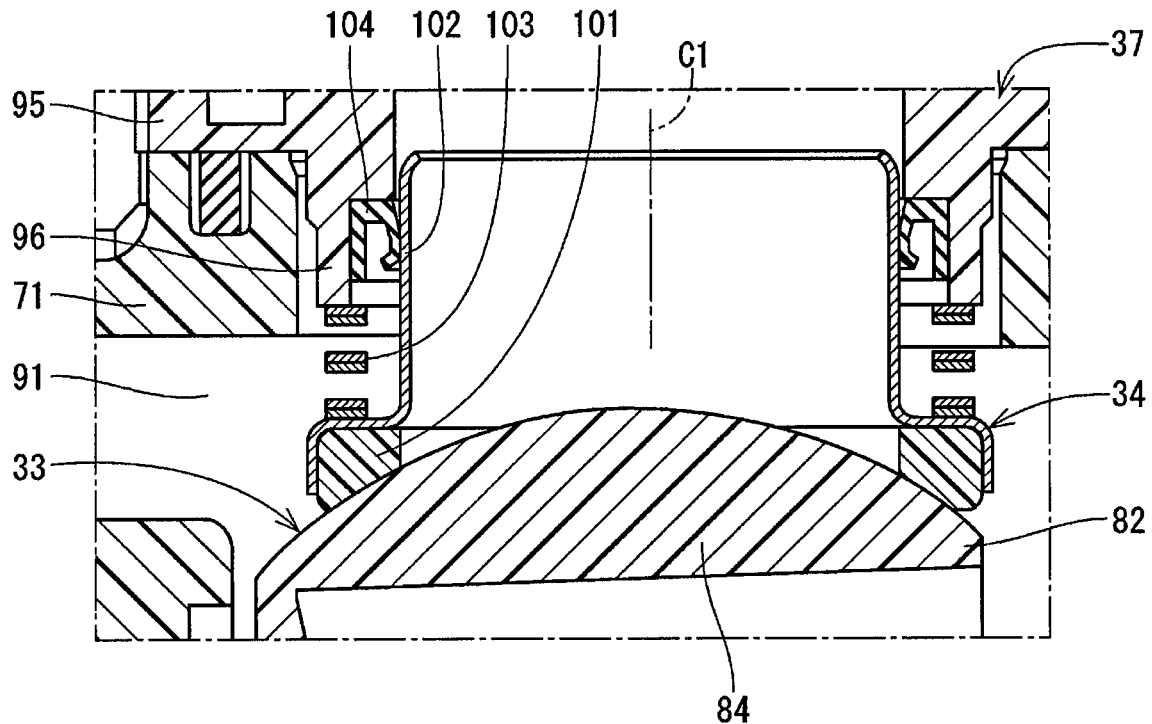
FIG. 5 is a schematically enlarged view of a portion V of FIG. 3.

Each of the sealing units 34, 35 and 36 is provided for each of the outlet ports 77, 78 and 79. As shown in FIGS. 3 and 5, the sealing unit 34 has a valve seal 101, a sleeve 102, a spring 103 and a sealing member 104. The valve seal 101 is an annular sealing member, which is in contact with the outer surface of the annular convex portion 84 of the valve member 33. The sleeve 102 is a cylindrical member provided in a direction from the outlet port 77 to the valve outside passage 91 and holding the valve seal 101. The spring 103 biases the sleeve 102 in a direction to the annular convex portion 84. The sealing member 104 seals an annular gap between the holding portion 96 of the holding plate 37 and the sleeve 102.

The sealing unit 34 seals a gap between the outlet port 77 and the valve outside passage 91. When the valve member 33 is rotated, a sealing condition is maintained by the sealing unit 34, wherein the annular convex portion 84 slides with respect to the valve seal 101.

The sealing unit 35 has a valve seal, a sleeve, a spring and a sealing member, in a similar manner to the sealing unit 34. The sealing unit 35 seals a gap between the outlet port 78 and the valve outside passage 91.

The sealing unit 36 has a valve seal, a sleeve, a spring and a sealing member, in a similar manner to the sealing unit 34. The sealing unit 36 seals a gap between the outlet port 79 and the valve outside passage 91.

As shown in FIGS. 2 and 3, the pipe member 38 includes a pipe portion 106 having a fluid passage 105 communicated to the outlet port 77, a pipe portion 108 having a fluid passage 107 communicated to the outlet port 78, and a pipe portion 110 having a fluid passage 109 communicated to the outlet port 79.

In the first embodiment, the inlet port 76 is connected to the outlet portion of the water jacket 21 (FIG. 1). The pipe portion 106 for the outlet port 77 is connected to the circulation passage 17 (FIG. 1). The pipe portion 108 for the outlet port 78 is connected to the circulation passage 18 (FIG. 1). The pipe portion 110 for the outlet port 79 is connected to the circulation passage 19 (FIG. 1).

In the cooling-water control valve 10 having the above structure, the cooling water having passed through the water jacket 21 and having increased its temperature flows into the valve outside passage 91 through the inlet port 76. The cooling water flows from the valve outside passage 91 into the valve inside passage 83 through the opened portion 92 of the valve member 33. The cooling water in the valve inside passage 83 is distributed to each of the pipe portions 106, 108 and 110 depending on an opening ratio of each opened portion 87, 88 and 89 of the valve member 33 with respect to each of the outlet ports 77, 78 and 79.

Figure 6:
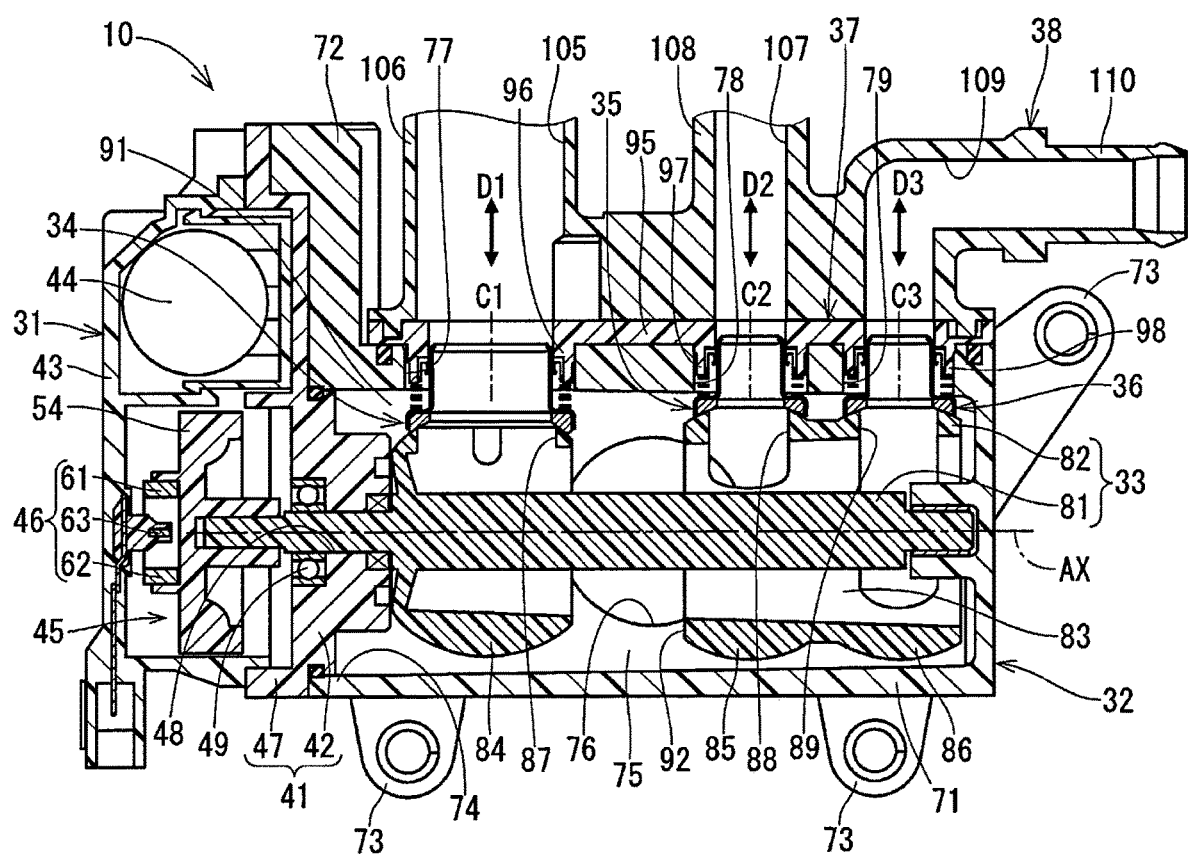
FIG. 6 is a schematic cross-sectional view taken along the plane passing through the axis line of the valve member for the cooling-water control valve of FIG. 2 and showing another condition that the opening degree at each opened portion of the valve member is 100%.

The opening ratio varies depending on the rotational position of the valve member 33. For example, in FIG. 3, the opening ratio of each opened portions 87, 88 and 89 is 0% (zero percent). On the other hand, in FIG. 6, the opening ratio of each opened portions 87, 88 and 89 is 100%. When the rotational position of the valve member 33 is changed from the position of FIG. 3 to the position of FIG. 6, the opening ratio of each opened portions 87, 88 and 89 is changed from 0% to 100%. The flow amount of the cooling water flowing to each of the circulation passages 17, 18 and 19 (FIG. 1) is thereby adjusted.

(Respective Ports and Related Parts)

The respective ports and related parts of the cooling-water control valve 10 will be further explained.

Figure 7:
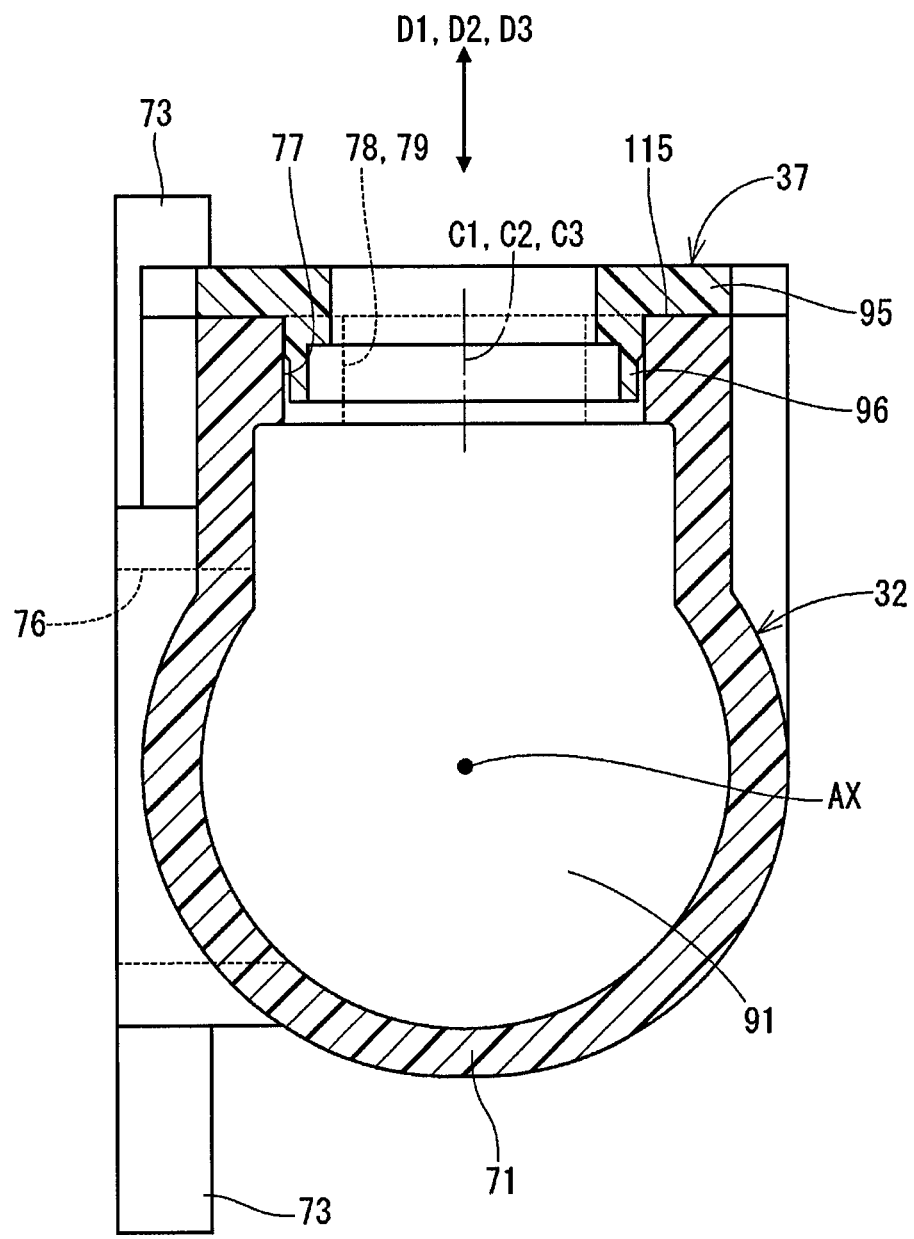
FIG. 7 is a schematic cross-sectional view taken along a line VII-VII of FIG. 3 and showing a housing and a holding plate.

As shown in FIG. 7, the inlet port 76 is formed in one of side walls of the housing 32, which is fixed to the engine 11, that is, the side wall in which the mounting flanges 73 are formed, in such a manner that the inlet port 76 penetrates the side wall in a radial direction of the housing 32. The inlet port 76 is connected to the outlet portion of the water jacket 21, when the housing 32 is fixed to the engine 11. Therefore, it is not necessary to prepare a specific pipe member for connecting the inlet port 76 to the water jacket 21.

As shown in FIG. 7, at least a part of each outlet port 77, 78 and 79 overlaps with one another in a circumferential direction of the housing 32 (that is, a direction equal to a rotational direction of the valve member 33), when viewed them in the axial direction (the direction parallel to the axis line AX). In other words, at least a part of one outlet port overlaps with all of the other outlet ports, when viewed them in the axial direction. When a case in which "one outlet port" is the outlet port 77 is taken as an example, at least the part of the outlet port 77 overlaps with the other outlet ports 78 and 79, when viewed them in the axial direction. In other words, as shown in FIG. 3, all of the outlet ports 77, 78 and 70 appear in the cross section including the axis line AX.

Figure 8:
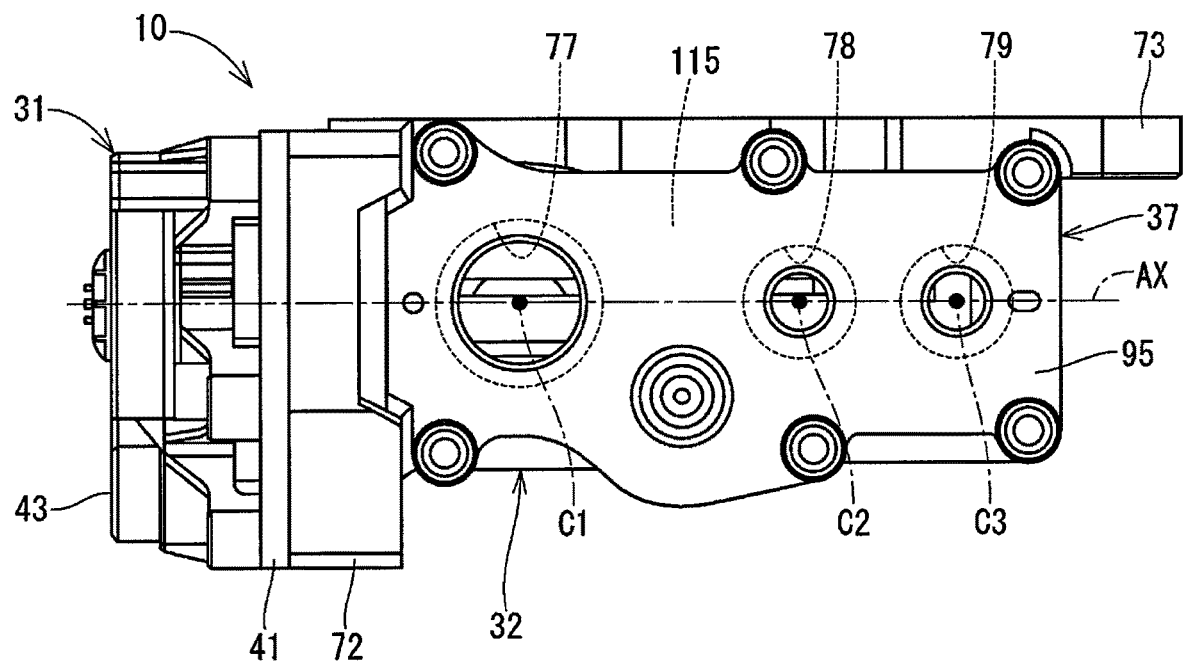
FIG. 8 is a schematic view showing the cooling-water control valve of FIG. 3 when viewed it in a direction of an arrow VIII, wherein a pipe member is removed.

In the first embodiment, as shown in FIG. 7, circumferential positions of center axes C1, C2 and C3 of the outlet ports 77, 78 and 79 coincide with one another, when viewed them in the axial direction. In addition, as shown in FIG. 8, each of the outlet ports 77, 78 and 79 is provided in an upper-side side wall 115 of the housing 32. Furthermore, the outlet ports 77, 78 and 79 are arranged on a single straight line.

As shown in FIGS. 3 and 7, each opening direction D1, D2 and D3 of the outlet ports 77, 78 and 79 (that is, a direction in which each center axis C1, C2 and C3 extends) is parallel to one another. The upper-side side wall 115 has a flat surface. Each of the opening directions D1, D2 and D3 is perpendicular to the upper-side side wall 115.

As shown in FIG. 3, the holding plate 37 holds all of the sealing units 34, 35 and 36 together. The holding plate 37 is made of a member, which is separate from the pipe member 38. The pipe member 38 is molded as one integral part including the pipe portion 106, the pipe portion 108 and the pipe portion 110.

(Advantages)

As explained above, in the first embodiment, at least the part of the one outlet port (for example, the outlet port 77) overlaps with all of the other outlet ports (the outlet ports 78 and 79), when viewed them in the axial direction.

According to the above structure, the outlet ports 77, 78 and 79 can concentrate in the predetermined portion of the housing 32 (for example, the portion defined by the straight line) in the rotational direction of the valve member 33. Therefore, at least a base portion of each pipe portion 106, 108 and 110, which is respectively connected to each of the outlet ports 77, 78 and 79, can be made smaller than a width of the housing 32 (a width in a horizontal direction in FIG. 7). It is, therefore, possible to make the cooling-water control valve 10 thinner and possible to mount the same in a narrow space.

Figure 9:
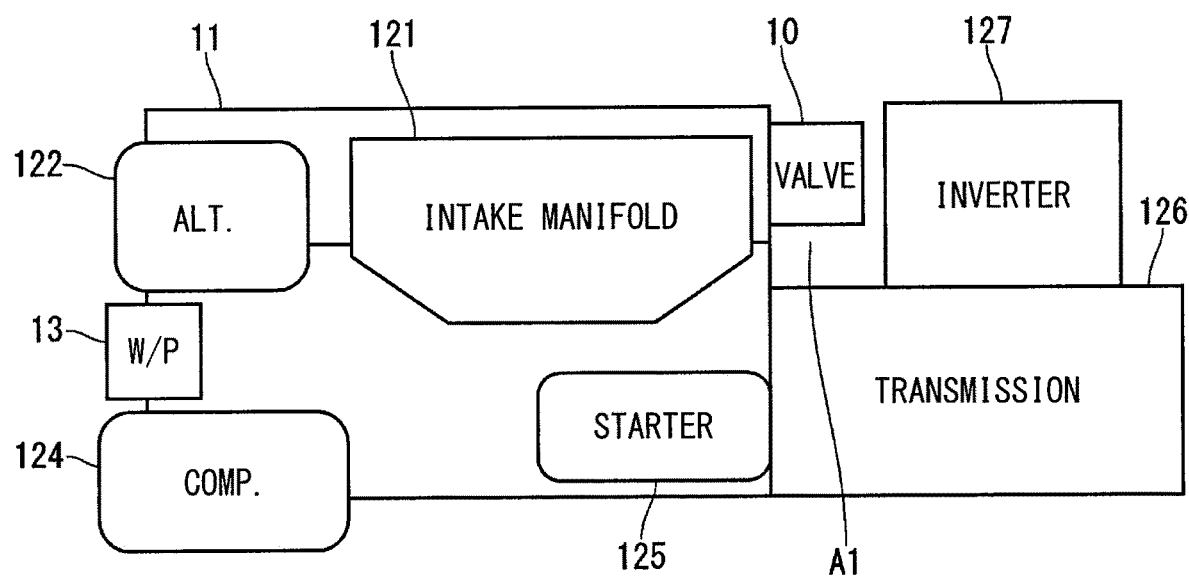
FIG. 9 is a schematic view showing an internal combustion engine and its related components of FIG. 1.

As shown in FIG. 9, an intake manifold 121, an alternator 122, the water pump 13, a compressor 124, a starter motor 125, a transmission apparatus 126 and so on are mounted to the engine 11. An inverter 127 is mounted to the transmission apparatus 126. The cooling-water control valve 10 can be mounted to the engine 11 in a narrow space A1 between the engine 11 and the inverter 127.

In addition, according to the first embodiment, the outlet ports 77, 78 and 79 are provided in the upper-side side wall 115 of the housing 32.

According to the above structure, the outlet ports 77, 78 and 79 can concentrate in the predetermined portion of the housing 32 in the rotational direction of the valve member 32.

The cooling-water control valve 10 of the first embodiment includes the sealing units 34, 35 and 36, each of which seals the gap between each of the outlet ports 77, 78 and 79 and the valve outside passage 91. The cooling-water control valve 10 further includes the multiple pipe portions 106, 108 and 110, each of which has the fluid passage connected to the respective outlet ports 77, 78 and 79.

In the present embodiment, it is possible to assemble those sealing units 34, 35 and 36 as well as those pipe portions 106, 108 and 110 to the cooling-water control valve 10 without rotating the housing 32, for example, around the axis line AX. Therefore, an assembling process can be easily done.

Furthermore, in the first embodiment, the opening directions D1, D2 and D3 of the outlet ports 77, 78 and 79 are parallel to one another. According to the above structure, since the sealing units 34, 35 and 36 can be assembled to the cooling-water control valve in one direction, the assembling process becomes easier. In addition, all of the sealing units 34, 35 and 36 can be assembled at the same time. In particular, in the first embodiment, the holding plate 37 collectively holds all of the sealing units 34, 35 and 36. When the sealing units 34, 35 and 36 and the holding plate 37 are sub-assembled to each other in advance and when such a sub-assembled unit is assembled to the housing 32, working efficiency can be further increased.

The holding plate 37, which holds the sealing units 34, 35 and 36, is made as an independent part from the pipe member 38.

Therefore, even when the pipe member 38 is detached from the cooling-water control valve 10, a condition in which the sealing units 34, 35 and 36 are assembled to the housing 32 can be maintained. In addition, it is possible to unify the configuration of the cooling-water control valve of a condition that the pipe member is not assembled, between the cooling-water control valve of the present embodiment and another cooling-water control valve having a different pipe member from that of the present embodiment. Then, it becomes easier to check leakage for the sealing units 34, 35 and 36. For example, it becomes easier to automatize a leakage checking process.

In addition, according to the first embodiment, the pipe portions 106, 108 and 110 are integrally formed with one another.

It is, therefore, possible to assemble the pipe portions 106, 108 and 110 in one assembling step. It is possible to increase the work efficiency.

Second Embodiment

Figure 10:
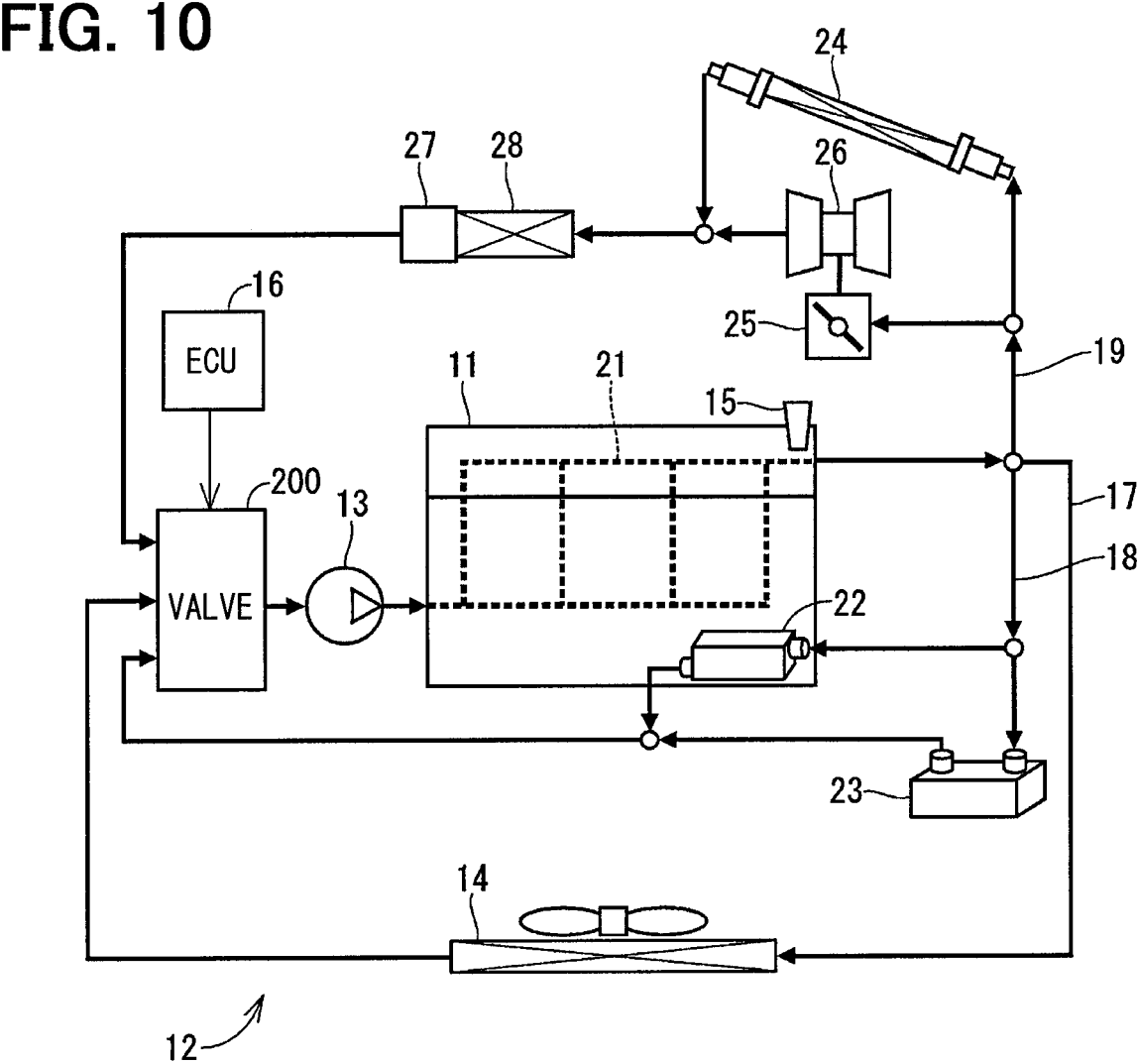
FIG. 10 is a schematic view for explaining the cooling system to which the cooling-water control valve according to a second embodiment is applied.

As shown in FIG. 10, according to a second embodiment, a cooling-water control valve 200 is provided at a position, which is a collecting point of the circulation passages 17, 18 and 19 and located at an upstream side of the water pump 13.

Figure 11:
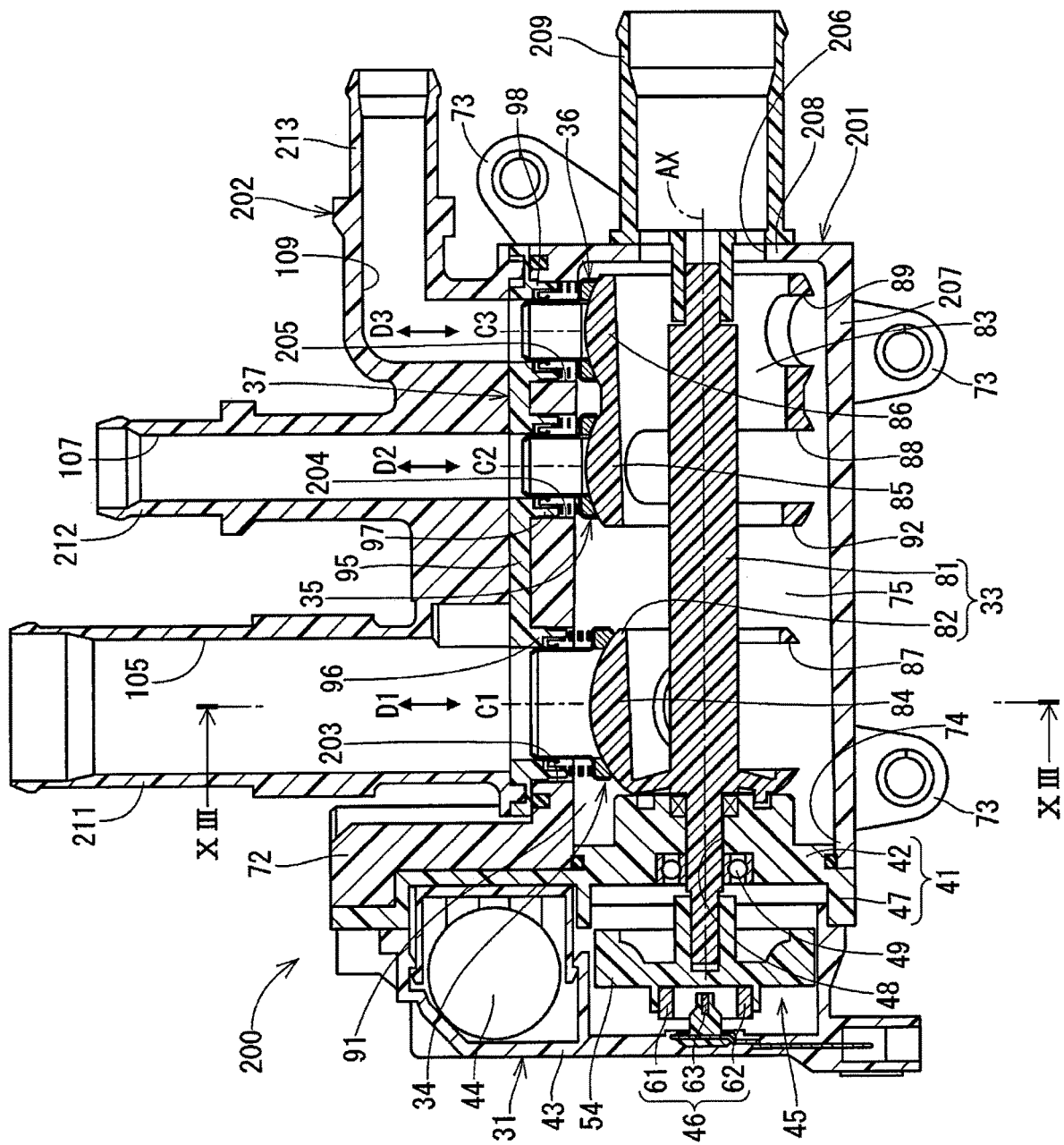
FIG. 11 is a schematic cross-sectional view of the cooling-water control valve of FIG. 10 and shows a condition that an opening degree at each opened portion of the valve member is 0%.
Figure 12:
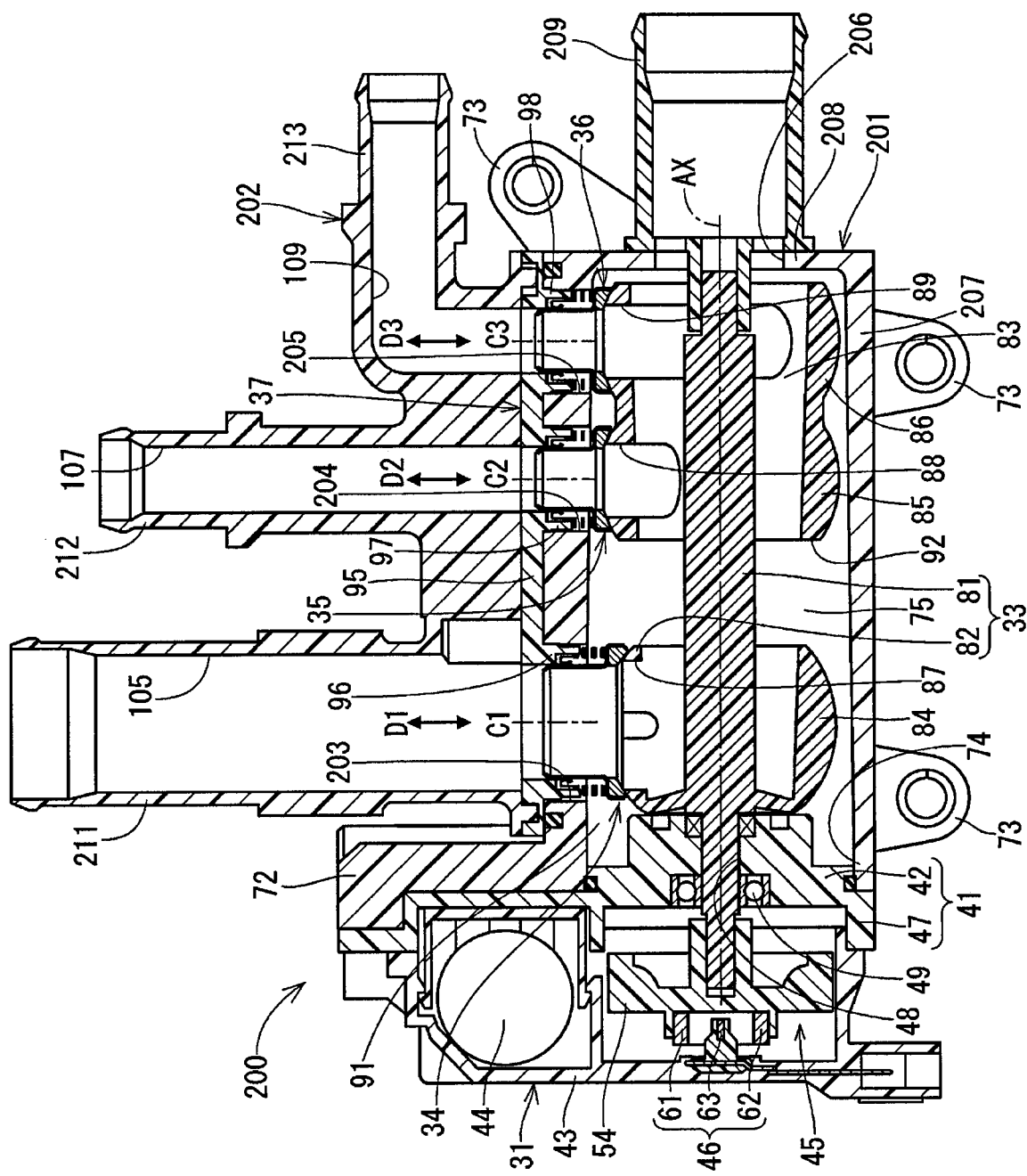
FIG. 12 is a schematic cross-sectional view of the cooling-water control valve and shows another condition that a valve member is rotated from a position of FIG. 11 to a position of FIG. 12, at which the opening degree of the opened portion becomes 100%.

As shown in FIGS. 11 and 12, the cooling-water control valve 200 includes the driving portion 31, the valve member 33, the sealing units 34, 35 and 36, and the holding plate 37, which are the same to those of the first embodiment. In addition, the cooling-water control valve 200 includes a housing 201 and a pipe member 202, instead of the housing 32 and the pipe member 38 of the first embodiment.

Figure 13:
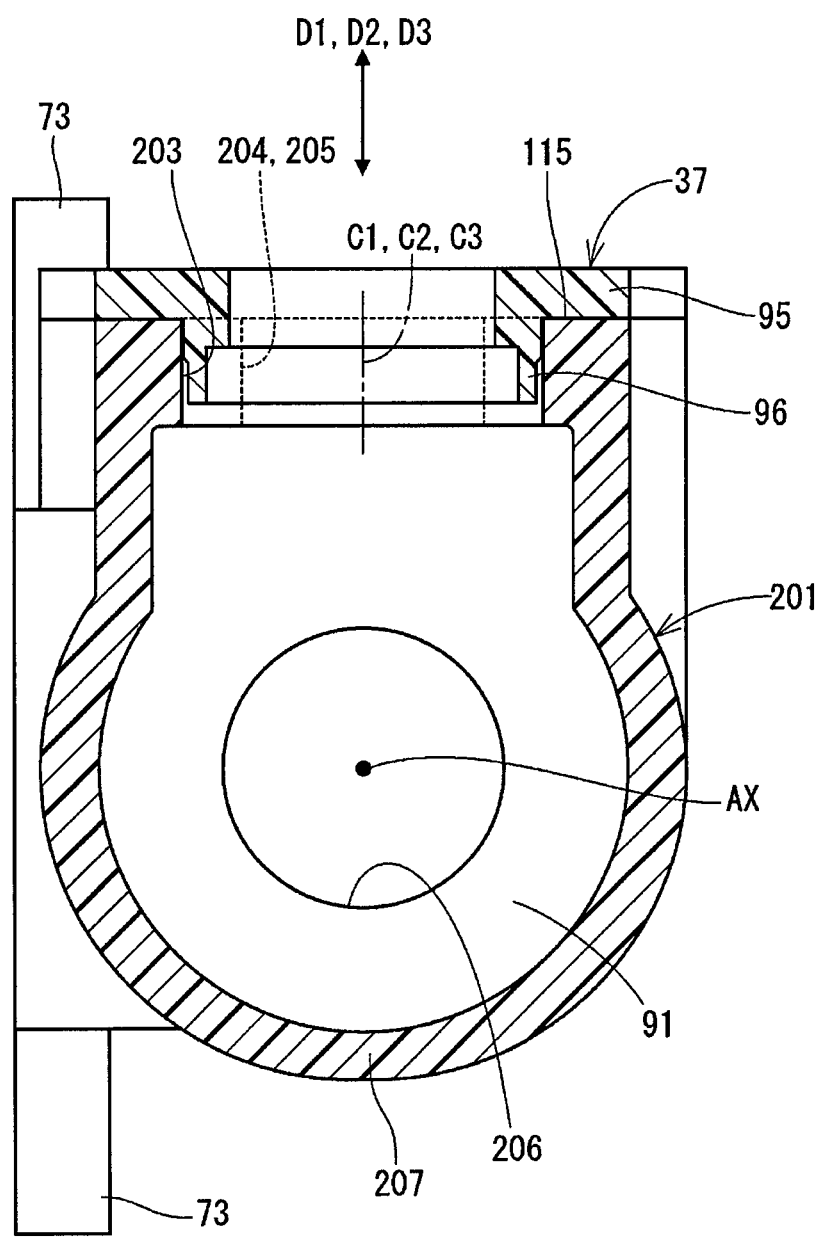
FIG. 13 is a schematic cross-sectional view taken along a line XIII-XIII in FIG. 11 and showing the housing and the holding plate.

The housing 201 has three inlet ports 203, 204 and 205 and one outlet port 206. Each of the inlet ports 203, 204 and 205 is a port through which the cooling water flows into the housing 201. Each of the inlet ports 203, 204 and 205 is a port, a position and a shape of which is the same to each of the outlet ports 77, 78 and 79 of the first embodiment. As shown in FIG. 13, at least a part of each inlet port 203, 204 and 205 overlaps with one another in the circumferential direction, when viewed them in the axial direction (the direction parallel to the axis line AX). In other words, at least a part of one inlet port (for example, the inlet port 203) overlaps with all of the other inlet ports (the inlet ports 204 and 205), when viewed them in the axial direction.

Figure 14:
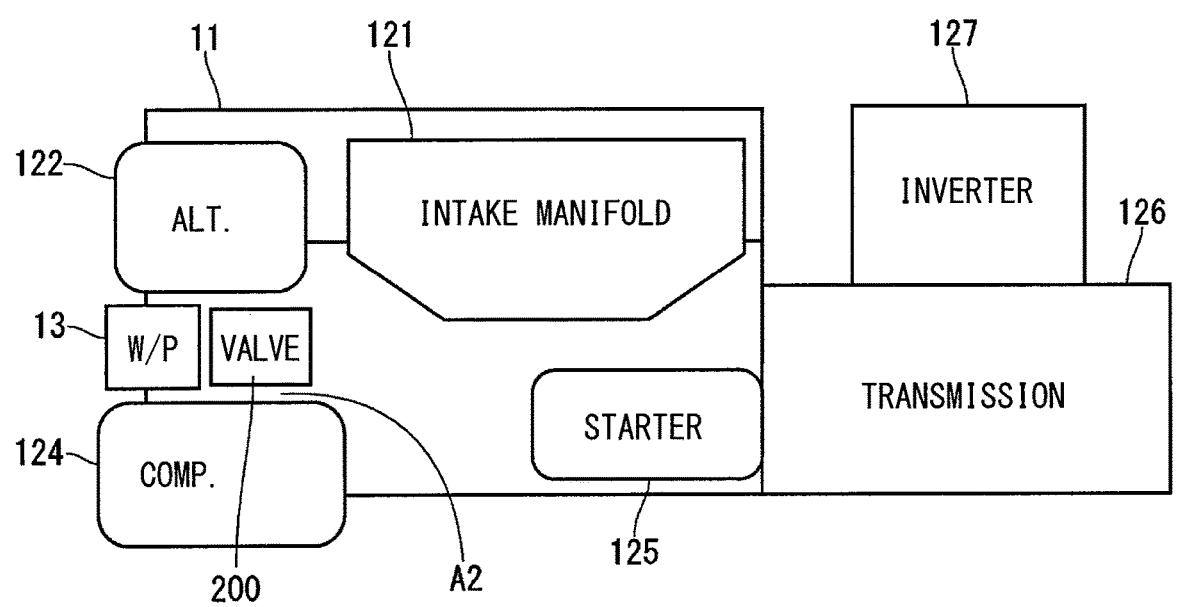
FIG. 14 is a schematic view showing the internal combustion engine and its related components of FIG. 10.

Accordingly, it is also possible in the second embodiment to make the cooling-water control valve 200 thinner in the same manner to the first embodiment. As shown in FIG. 14, it is possible to mount the cooling-water control valve 200 to the engine 11 in a narrow space A2, which is a space neighboring to the water pump 13 and which is formed between the alternator 122 and the compressor 124.

The housing 201 has the outlet port 206 at an axial end 208 of a housing main body 207, which is located at a position opposite to the driving portion 31 in the axial direction. The housing 201 further has an outlet pipe portion 209 fixed to the axial end 208. The outlet port 206 is in communication with the inner space 75 independently from the rotational position of the valve member 33. The valve member 33 operatively communicates the outlet port 206 with the inlet ports 203, 204 and 205 or blocks off the communication between them depending on the rotational position of the valve member 33.

As above, a relationship between the one port (the outlet port 206) and the other three ports (the inlet ports 203, 204, 205) is opposite to that of the first embodiment. It is not necessary in the second embodiment to provide the outlet port 206 in a direction perpendicular to the axial direction of the valve member 33 like the first embodiment. Therefore, it is possible to more flexibly select a layout of the pipe portion to be connected to the outlet port 206. Flexibility for mounting the cooling-water control valve to the engine can be increased. Since the outlet port 206 is provided at the position of the housing 201, which is located in the axial direction of the valve member 33, it is possible to reduce a number of curved portions for the fluid flow of the cooling water in a passage from the inlet ports 203, 204 and 205 to the outlet port 206. It is, therefore, possible to reduce resistance for the fluid flow.

The pipe member 202 includes pipe portions 211, 212 and 213. As shown in FIG. 11, each of the pipe portions 211, 212 and 213 is formed at a position, which is located on the cross section including the axis line AX and passing through the inlet ports 203, 204 and 205. The pipe member 202 is made smaller than a width of the housing 201. It is, therefore, possible to make the cooling-water control valve 200 thinner.

Third Embodiment

Figure 15:
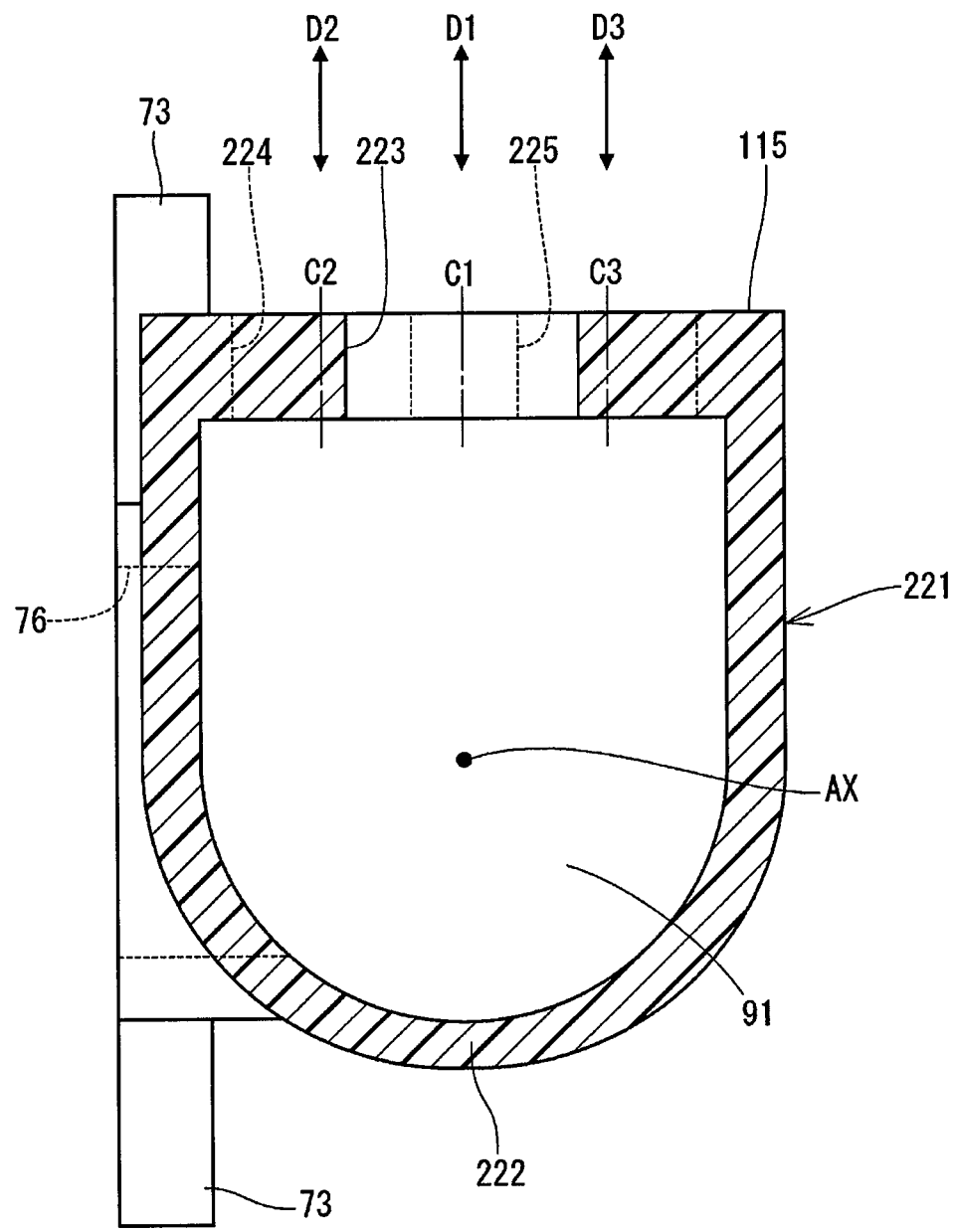
FIG. 15 is a schematic cross-sectional view showing the housing of the cooling-water control valve according to a third embodiment and corresponds to FIG. 7 of the first embodiment.

As shown in FIG. 15, according to a third embodiment, a housing main body 222 of a housing 221 has outlet ports 223, 224 and 225. The opening directions D1, D2 and D3 of the outlet ports 223, 224 and 225 are parallel to one another. The outlet port 224 partly overlaps with the outlet port 223 but does not overlap with the outlet port 225 in the circumferential direction, when viewed them in the axial direction.

As above, it is adequate that at least a part of one outlet port overlaps with one of the other outlet ports, when viewed them in the axial direction. Even in such an arrangement, it is possible to concentrate the outlet ports 223, 224 and 225 at a predetermined portion of the housing 221 in the rotational direction of the valve member. It is possible to make the cooling-water control valve thinner.

Fourth Embodiment

Figure 16:
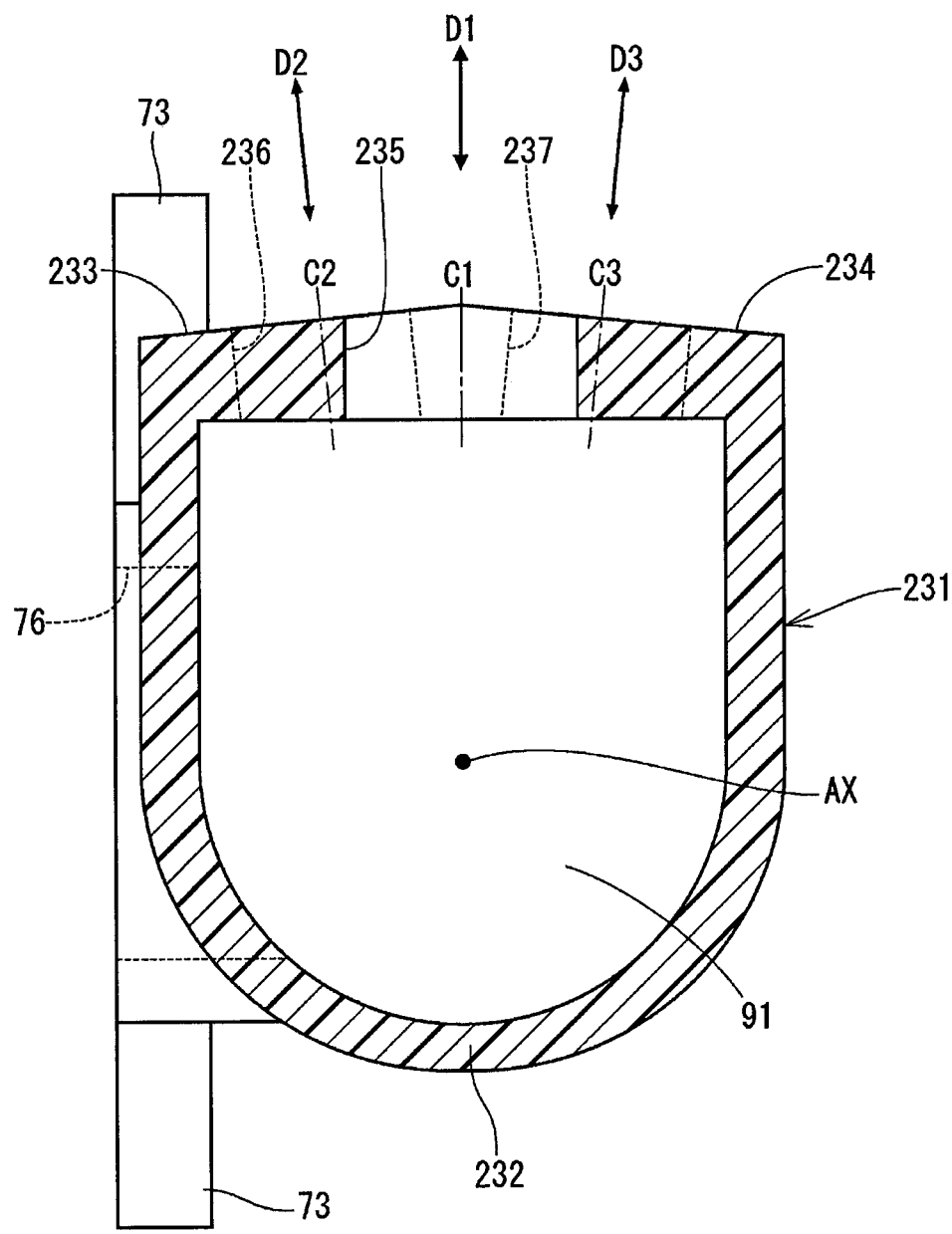
FIG. 16 is a schematic cross-sectional view showing the housing of the cooling-water control valve according to a fourth embodiment and corresponds to FIG. 7 of the first embodiment.

As shown in FIG. 16, according to a fourth embodiment, a housing main body 232 of a housing 231 has a first side surface 233 and a second side surface 234. The first side surface 233 and the second side surface 234 are not formed on the same flat surface.

The housing main body 232 has outlet ports 235, 236 and 237. The outlet port 235 is opened at the first side surface 233 and the second side surface 234. The outlet port 236 is opened only at the first side surface 233. The outlet port 237 is opened only at the second side surface 234. As above, it is not always necessary to provide all of the outlet ports on one flat side surface.

The outlet port 236 partly overlaps with the outlet port 235 but does not overlap with the outlet port 237 in the circumferential direction, when viewed them in the axial direction. As above, it is adequate that at least a part of one outlet port overlaps with one of the other outlet ports, when viewed them in the axial direction. Even in such an arrangement, it is possible to concentrate the outlet ports 235, 236 and 237 at a predetermined portion of the housing 231 in the rotational direction of the valve member. It is possible to make the cooling-water control valve thinner.

The opening directions D1, D2 and D3 of the outlet ports 235, 236 and 237 are not parallel to one another in the fourth embodiment. It can be so modified that the opening directions D1, D2 and D3 are not parallel to one another, as above. Even in such a modification, it is possible to assemble the sealing units to the cooling-water control valve without rotating the housing 231.

Further Embodiments and/or Modifications

According to a further embodiment or modification, the cooling system to which the cooling-water control device is applied is not limited to the cooling system shown in FIG. 1 or FIG. 10. It is possible to change the components to be provided in the circulation passages. The number of the circulation passages may be changed to two or four (or more than four). The number of second ports (the ports to be formed in the housing and to be closed depending on the rotational position of the valve member) may be correspondingly changed to two or four (or more than four).

According to a further embodiment or modification, the holding plate and the multiple pipe portions may be integrally formed with one another.

According to a further embodiment or modification, the driving portion may be composed of a driving unit of a different type. Any well-known driving unit, which outputs the rotational driving power, can be used as the driving portion.

According to a further embodiment or modification, the shaft portion and the cylindrical portion of the valve member may be made of different parts from each other. In addition, in the cylindrical portion, the annular convex portions may be made of parts, which are separately made from one another.

The present disclosure is not limited to the above embodiments or modifications but can be further modified in various manners without departing from a spirit of the present disclosure.

The present disclosure is explained with reference to the above embodiments and modifications. However, the present disclosure is not limited to the structures of those embodiments and/or modifications. The present disclosure may include various kinds of modifications and modified embodiments within a scope of equivalents. In addition, various kinds of the combinations and modifications as well as the other combinations and modifications, in which one or more than one element is added or one or more than one element is eliminated, are included within the meaning and the spirit of the present disclosure.

What is claimed is:

1. A valve device comprising;
  a housing having a first port and multiple second ports, each of which connects an inner space of the housing to an outside of the housing;
  a valve member rotatably provided in the inner space and operatively connects the first port to the multiple second ports, or disconnects the first port from the multiple second ports, depending on a rotational position of the valve member;
  multiple sealing units, comprising;
  a spring;
  a valve seal;
  and a seal member
  wherein each of which seals a gap between each one of the multiple second ports and a valve outside passage, which is formed in the inner space of the housing at a position outside of the valve member;
  multiple pipe portions, each of which has a fluid passage connected to each of the multiple second ports; and
  a holding member, which is made as an independent part from the multiple pipe portions and holds the multiple sealing units,
  wherein the first port is communicated to the inner space independently of the rotational position of the valve member,
  wherein at least a part of one of the second ports overlaps with one or more than one of the other second ports, when they are viewed in an axial direction of the valve member, and
  wherein the holding member holds all of the multiple sealing units together,
  wherein each of the multiple sealing units is provided for each of the multiple second ports.

2. The valve device according to claim 1, wherein at least the part of the one of the second ports overlaps with all of the other second ports, when they are viewed thcm in the axial direction of the valve member.

3. The valve device according to claim 1, wherein
  the multiple second ports are provided in a side wall of the housing.

4. The valve device according to claim 1, wherein
  opening directions of the multiple second ports are parallel to one another.

5. The valve device according to claim 1, wherein
  the multiple pipe portions are integrally formed with one another.

6. The valve device according to claim 1, wherein the first port is provided at a portion of the housing, which is positioned in the axial direction of the valve member.

\* \* \* \* \*